Feb. 21, 1967    R. L. EARNHART    3,305,772
TIMER SEQUENCE TESTER HAVING PLURAL LAMP
INDICATORS AND TEMPLATE MEANS
Filed May 4, 1964    2 Sheets-Sheet 1

INVENTOR.
Robert L. Earnhart
BY Frederick M. Ritchie
His Attorney

Feb. 21, 1967                R. L. EARNHART                3,305,772
           TIMER SEQUENCE TESTER HAVING PLURAL LAMP
                 INDICATORS AND TEMPLATE MEANS
Filed May 4, 1964                                     2 Sheets-Sheet 2
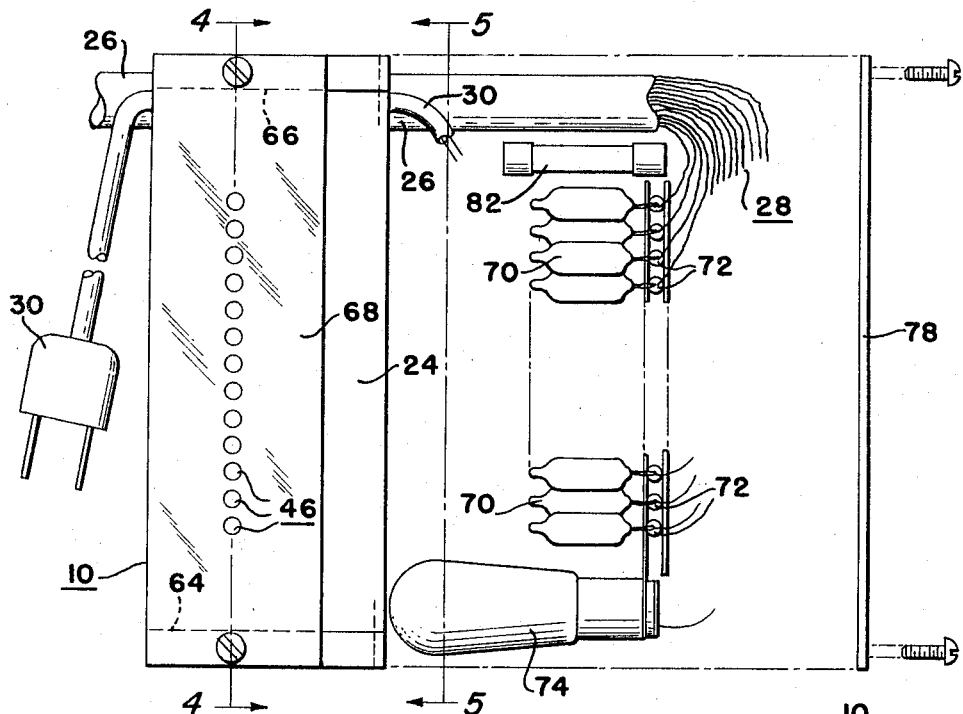
Fig. 3
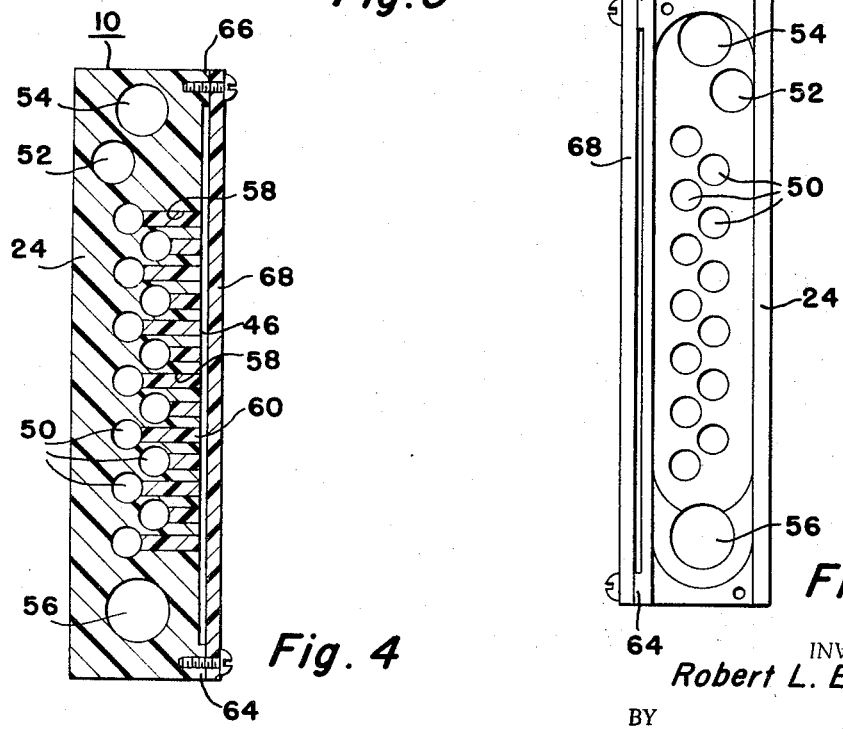
Fig. 4
Fig. 5
INVENTOR.
Robert L. Earnhart
BY
Frederick M. Ritchie
His Attorney United States Patent Office 3,305,772
Patented Feb. 21, 1967

3,305,772
TIMER SEQUENCE TESTER HAVING PLURAL LAMP INDICATORS AND TEMPLATE MEANS
Robert L. Earnhart, Waynesville, Ohio, assignor to General Motors Corporation, Detroit, Mich., a corporation of Delaware
Filed May 4, 1964, Ser. No. 364,462
4 Claims. (Cl. 324—51)

This invention relates to a domestic appliance and more particularly to an improved timer sequence tester for testing the continuity of circuits in appliance timers and the proper operation of a timer motor.

Operating cycles of modern domestic appliances are somewhat involved and the timers for controlling the operation of these cycles have necessarily become quite complex. In evaluating the operation of an appliance, one of the first things to check is the proper functioning of the appliance timer. This can be done by advancing the appliance timer through its control cycle and observing the various operations which occur during the advance of the timer. This invention is directed to a timer sequence tester which can be plugged into the appliance timer as a substitute for the actual operating components of the appliance and which includes indicating lights for informing the service technician whether or not the timer is properly sequencing the appliance cycle and whether or not the timer motor for the timer is operating at the design voltage.

Accordingly, it is an object of this invention to provide a timer sequence tester which includes a plurality of continuity indicating lights connectable in series with the switching circuits of a timer to selectively evaluate the continuity of the circuits as the timer is advanced.

Another object of this invention is the provision of a timer sequence tester which includes a timer motor test lamp adapted to be connected in series with the timer motor and having a sufficient resistance to ascertain whether or not the timer motor will operate at the minimum voltage for which the motor was designed.

Further objects and advantages of the present invention will be apparent from the following description, reference being had to the accompanying drawings wherein a preferred embodiment of the present invention is clearly shown.

In the drawings:

FIGURE 3 is an exploded elevational view of the timer sequence tester;

FIGURE 4 is a sectional view taken along line 4—4 in FIGURE 3; and

FIGURE 5 is a side elevational view of the timer sequence tester housing taken in the direction of 5—5 in FIGURE 3.

Figure 1:
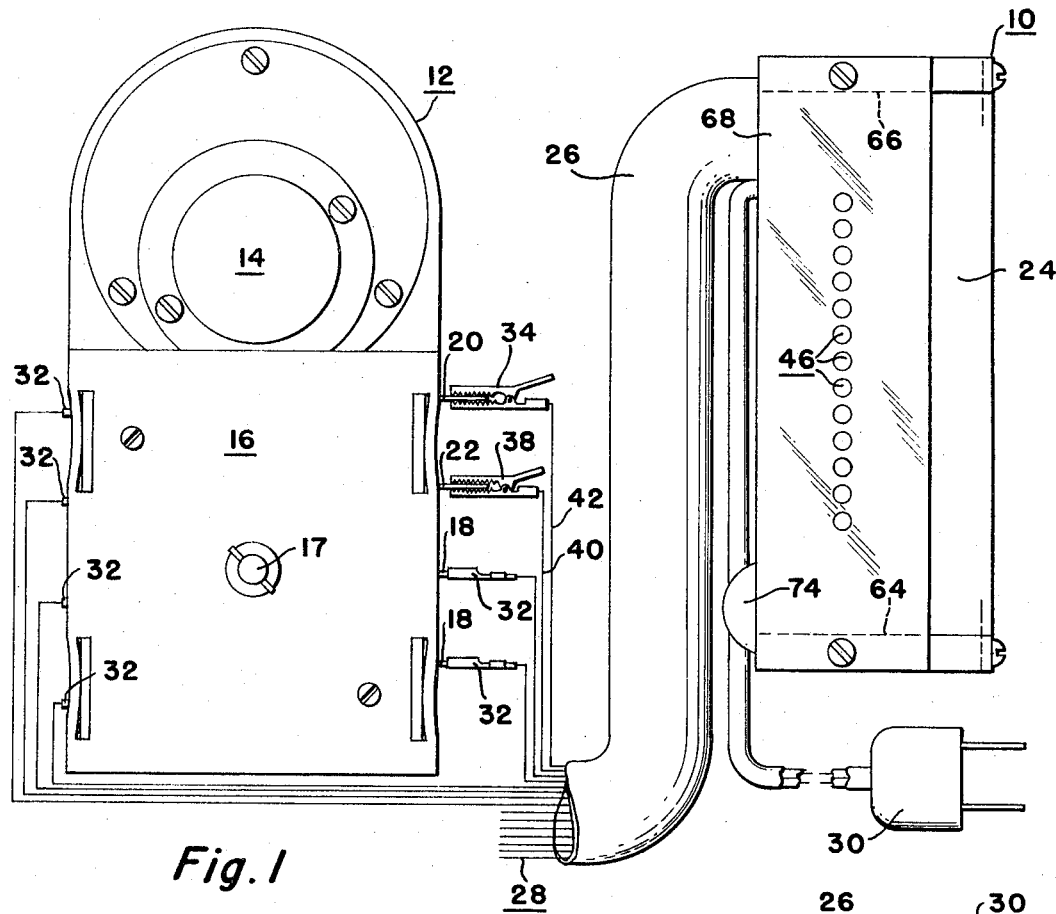
FIGURE 1 is a fragmentary top elevational view with parts broken away of the timer sequence tester of this invention connected to the terminal connectors of a timer to be tested.

In accordance with this invention and with reference to FIGURE 1, the timer sequence tester or timer analyzer 10 is shown in juxtaposition to a timer 12 which is to be tested. The timer is conventional and comprised of a synchronous motor section 14 and a cam actuated switching section 16—a cam shaft 17 extending outwardly for manual advance of the timer. The three-watt, 115 volts, 60 cycle motor 14, when energized to operate the timer through a sequence cycle, opens and closes the various switches (not shown) in the cam actuated switch section 16 and thereby selectively energizes the switch connectors 18, each of which represent an operation to be controlled by the timer. Conventionally, the timer motor 14 may be energized through a timer motor connector 22 while power for all of the switching circuits is supplied at a power supply switch connector 20.

Figure 2:
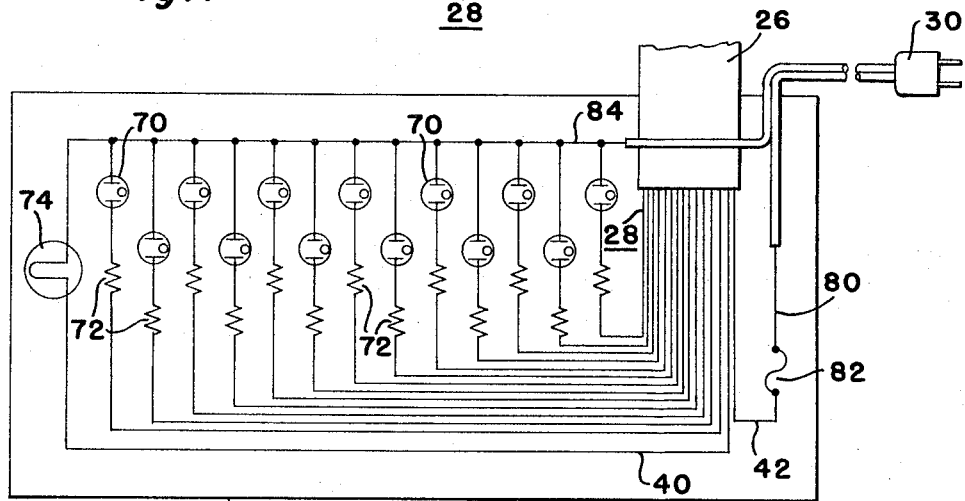
FIGURE 2 is a schematic wiring diagram of the timer sequence tester.

In general, the timer sequence tester 10 is comprised of phenolic insulating housing means 24 enclosing the various test circuitry, a lead conduit 26 enclosing the plurality of test leads 28 shown in FIGURE 2 and a power supply plug 30 which, when plugged into any domestic power source, supplies the energy for operating the timer 12 apart from its domestic appliance control environment. As shown in FIGURE 1, each of the test leads 28 is supplied with either a conventional female terminal connector 32 adapted for push on connection with its mating male terminal connector 18 or with an alligator clip such as 34 and 38 which may be used on the timer motor return wire 40 and the power supply conductor 42. When connected as shown in FIGURE 1 and after the power plug 30 is connected to a power source, selectively illuminating openings 46 will indicate circuit continuity through the timer 12.

Turning now to FIGURES 4 and 5, the insulating housing 24 is shown comprised of a 4½" x 1¾" x 1" drilled out block of phenolic having ¼" diameter timer circuit continuity test lamp pockets 50 drilled therein, a pocket 52 for a fuse 82 and several holes completely through the housing, namely a ⅜" diameter passageway 54 for the test lead conduit and power supply cord and a tapered ¾" to ½" diameter timer motor test lamp cavity 56. At right angles to the continuity test lamp pockets 50, ⅛" diameter holes 58 are drilled to interconnect with the pockets 50 and these holes, slightly tapered, are subsequently plugged by pieces of clear plastic 60, such as Plexiglas, which serve to pipe light from the pockets 50 to the indicating openings 46 on the top of the housing. A pair of rails 64, 66, at opposite ends of the housing, support a clear plastic template guide 68 a spaced distance from the test lamp indicating openings 46 in a manner to receive a template (not shown) which is imprinted with special indicia characteristic of a particular timer 12. The template is no more than an elongated sheet of paper with a selected number of circles arranged in a vertical column for each timer increment—each circle representing a circuit to be made and aligning with one of the openings 46 as the template is advanced thereover within the guide means 68. Whenever one of the indicator openings 46 illuminates under an imprinted circle on the template, the particular timer circuit involved shows the proper continuity through the timer.

In the exploded view of FIGURE 3, the tester circuit means is shown comprised of the test lead conduit 26 extending through the passageway 54 in the housing 24. The test leads 28 are connected respectively with thirteen NE2H (size 2 neon high brilliance) lamps 70, each of said lamps being connected in series with an equal number of 22,000 ohm resistors 72. A six-watt 120-volt motor test lamp 74 is also connected in the circuit—the motor test lamp 74 being enclosed in the cavity 56 of the housing 24 while each of the neon bulbs 70 extends into its respective pocket 50 in the housing. When the tester circuit means is assembled into the housing 24 with the cord of the power supply conductor means 30 in the passageway 54, a cover 78 may be fastened to one side of the housing to isolate the electrical circuitry from the operator of the timer sequence tester.

The circuitry of the tester 10 is shown best in FIGURE 2. Note that the power supply conductor means 30 includes a hot wire or power supply conductor 80 leading through a fuse 82 to the supply lead 42 extending through the conduit 26 for connection to the timer power supply connector 20. The power supply conductor 30 includes also the ground wire 84 connected to one side of the continuity test lamps 70 and the timer motor test lamp 74. The return wire 40 from the timer motor is connected to the other side of the timer motor test lamp 74 and the remainder of the test leads 28 are connected respectively to the opposite sides of each of the resistors 72—a particular continuity test lamp 70 and serially arranged resistor 72 being placed in series with a respective switching circuit in the timer 12. In like respect, the timer motor test lamp 74 is placed in series with the timer motor 14.

In accordance with one aspect of this invention, the timer motor test lamp 74 is selected as having a resistance of 230 ohms which, when placed in series with a motor 14 having a resistance of 1000 ohms, serves to drop the test voltage at the timer motor to approximately 95 volts. This is the minimum power supply voltage at which the timer must operate. It should be understood that the motor test lamp 74 can be selected to produce a voltage drop of whatever extent is needed to determine whether or not the timer motor 14 will operate at the minimum design voltage.

To use the timer sequence tester 10, the service technician will identify the timer 12 and select the proper template for use with the tester. The leads 28 are color coded to match with indicia on the timer 12 so that the female terminal connectors 32 may be pushed into electrical connection with the proper male terminal connectors 18.

The tester cord 30 is then plugged into a 120 volt A.C. power supply, the motor return wire clip 38 is connected to the timer motor terminal connector 22 and the power supply clip 34 connected to the power supply terminal connector 20. As the timer motor 14 advances the cycle, the terminal connectors 18 are selectively and sequentially energized in accordance with the operation of the cam actuating switch devices in the timer switch section 16. The critical points of the timed cycle may be analyzed by observing the match of the template circles with the illumination of the opening 46.

If, under the above setup, the timer motor 14 does not advance the cycle, it can be determined that the motor will not operate at its minimum design voltage. Normally, the motor should run with the motor test lamp 74 producing a dull glow. On the other hand, if the motor test lamp produces a brilliant light, an indication is given that at least a portion of the motor resistance is bypassed and a short circuit in the motor is indicated.

With the timer sequence tester 10 of this invention, it is also possible to advance the timer 12 through its cycle of operations manually. To operate the tester in this manner, the motor return wire clip 38 is disconnected from the terminal 22 and the various switch connectors 18 selectively energized by manually rotating the timer shaft 17.

While the embodiment of the present invention as herein disclosed constitutes a preferred form, it is to be understood that other forms might be adopted.

What is claimed is as follows:

1. A timer sequence tester adapted for electrical connection to a timer having a plurality of timer switch connectors and a motor for selectively energizing said switch connectors in accordance with the sequencing of said timer, said tester comprising
    (a) insulated housing means having a timer circuit test lamp pocket and a timer motor test lamp cavity, said housing means having an indicator opening in light receiving communication with said pocket for illuminating said opening,
    (b) means for supporting a template representative of said timer in juxtaposition with said opening to facilitate the comparison of markings on said template with the illumination of said opening,
    (c) tester circuit means adapted for interposition between a power source and said timer and selectively energizable in accordance with the selective energization of said switch connectors, said tester circuit means including a continuity test lamp in said pocket, said continuity test lamp adapted for connection in series with one of said timer switch connectors, and a timer motor test lamp in said cavity adapted for connection in series with the motor of said timer through another one of said timer switch connectors, said timer motor test lamp having a sufficient resistance which when serially arranged with the resistance of said motor drops the voltage of power supplied to said motor to approximately the minimum voltage at which said motor is designed to operate,
    (d) and power supply conductor means adapted to be connected to a power source and having ground means connected to one side of said lamps and power means adapted to be connected through said motor and said switch connectors of said timer to the other side of said lamps, the motor of said timer being energizable thereby to selectively energize the switch connectors,
    (e) the illumination of said continuity test lamp serving to indicate the proper or improper energization of its respective switch connector,
    (f) and the illumination of said timer motor test lamp serving to indicate the energization of the timer motor and to drop the test voltage at said timer motor to that minimum voltage at which said timer motor is designed to operate.

2. A timer sequence tester adapted for electrical connection to a timer having a plurality of timer switch connectors and a motor for selectively energizing said switch connectors in accordance with the sequencing of said timer, said tester comprising
    (a) insulated housing means having a timer circuit test lamp pocket and a timer motor test lamp cavity, said housing means having an indicator opening in light receiving communication with said pocket for illuminating said opening,
    (b) means for supporting a template representative of said timer in juxtaposition with said opening to facilitate the comparison of markings on said template with the illumination of said opening,
    (c) tester circuit means adapted for interposition between a power source and said timer and selectively energizable in accordance with the selective energization of said switch connectors, said tester circuit means including a continuity test lamp in said pocket, said continuity test lamp adapted for connection in series with one of said timer switch connectors, and a timer motor test lamp in said cavity adapted for connection in series with the motor of said timer through another one of said timer switch connectors, said timer motor test lamp having a sufficient resistance which when serially arranged with the resistance of said motor drops the voltage of power supplied to said motor to approximately the minimum voltage at which said motor is designed to operate,
    (d) and power supply conductor means adapted to be connected to a power source and having ground means connected to one side of said lamps and power means adapted to be connected through said motor and said switch connectors of said timer to the other side of said lamps, the motor of said timer being energizable thereby to selectively energize the switch connectors,
    (e) the illumination of said continuity test lamp serving to indicate the proper or improper energization of its respective switch connector.

3. A timer sequence tester adapted for electrical connection to a timer having a plurality of timer switch connectors and a motor for selectively energizing said switch connectors in accordance with the sequencing of said timer, said tester comprising
    (a) insulated housing means having a plurality of timer circuit test lamp pockets and a timer motor test lamp cavity, said housing means having a plurality of indicator openings on an outer surface thereof and passage means including a light transmitting plastic plug respectively interconnecting said openings with said pockets to pipe light from said pockets to said openings for illuminating said openings,
(b) means for guiding a template representative of said timer in juxtaposition with said openings to facilitate the comparison of markings on said template with the illumination of said openings,
(c) tester circuit means adapted for interposition between a power source and said timer and selectively energizable in accordance with the selective energization of said switch connectors, said tester circuit means including a continuity test lamp in each of said pockets, each of said continuity test lamps adapted for connection respectively in series with some of said timer switch connectors, a timer motor test lamp in said cavity adapted for connection in series with the motor of said timer through another one of said timer switch connectors, a resistor in seires with each of said continuity test lamps and fuse means operable as a protection device in case of short circuits encountered in using the tester,
(d) said timer motor test lamp having a sufficient resistance which when serially arranged with the resistance of said motor drops the voltage of power supplied to said motor to approximately the minimum voltage at which said motor is designed to operate,
(e) and power supply conductor means adapted to be connected to a power source and having ground means connected to one side of all of said lamps and said resistors and power means adapted to be connected through said fuse means, said motor and said switch connectors of said timer to the other side of said lamps and said resistors, the motor of said timer being energizable thereby to selectively energize the switch connectors,
(f) the ilumination of each of said continuity test lamps serving to indicate the proper or improper energization of its respective switch connector,
(g) and the ilumination of said timer motor test lamp serving to indicate the energization of the timer motor and to drop the test voltage at said timer motor to that minimum voltage at which said timer motor is designed to operate.

4. A timer sequence tester adapted for electrical connection to a timer having a plurality of timer switch connectors and a motor for selectively energizing said switch connectors in accordance with the sequencing of said timer, said tester comprising
(a) insulated housing means having a plurality of timer circuit test lamp pockets and a timer motor test lamp cavity, said housing means having a plurality of indicator openings on an outer surface thereof and passage means including a light transmitting plastic plug respectively interconnecting said openings with said pockets to pipe light from said pockets to said openings for illuminating said openings,
(b) means for guiding a template representative of said timer in juxtaposition with said openings to facilitate the comparison of markings on said template with the illumination of said openings,
(c) tester circuit means adapted for interposition between a power source and said timer and selectively energizable in accordance with the selective energization of said switch connectors, said test circuit means, including a continuity test lamp in each of said pockets, each of said continuity test lamps adapted for connection respectively in series with some of said timer switch connectors, a timer motor test lamp in said cavity adapted for connection in series with the motor of said timer through another one of said timer switch connectors, said timer motor test lamp having a sufficient resistance which when serially arranged with the resistance of said motor drops the voltage of power supplied to said motor to approximately the minimum voltage at which said motor is designed to operate, a resistor in seires with each of said continuity test lamps and fuse means operable as a protection device in case of short circuits encountered in using the tester,
(d) and power supply conductor means adapted to be connected to a power source and having ground means connected to one side of all of said lamps and said resistors and power means adapted to be connected through said fuse means, said motor and said switch connectors of said timer to the other side of said lamps and said resistors, the motor of said timer being energizable thereby to selectively energize the switch connectors,
(e) the illumination of each of said continuity test lamps serving to indicate the proper or improper energization of its respective switch connector,
(f) and the illumination of said timer motor test lamp serving to indicate the energization of the timer motor and to drop the test voltage at said timer motor to that minimum voltage at which said timer motor is designed to operate.

References Cited by the Examiner

UNITED STATES PATENTS

| | | | |
|---|---|---|---|
| 2,810,881 | 10/1957 | Daily | 324—73 X |
| 2,887,622 | 5/1959 | Rayburn et al. | 324—73 X |
| 2,977,530 | 3/1961 | Cook | 324—51 |
| 2,982,913 | 5/1961 | Berry | 324—66 X |
| 3,011,061 | 11/1961 | Dickinson | 250—237 |
| 3,163,926 | 1/1965 | Gray | 324—66 X |

WALTER L. CARLSON, *Primary Examiner.*

G. R. STRECKER, *Assistant Examiner.*